United States Patent

[11] 3,629,796

| [72] | Inventors | Eugene R. Brownscombe<br>Dallas;<br>William M. Campbell, Irving; Emmet D. Riggs, Dallas, all of Tex. |
|---|---|---|
| [21] | Appl. No. | 782,965 |
| [22] | Filed | Dec. 11, 1968 |
| [45] | Patented | Dec. 21, 1971 |
| [73] | Assignee | Atlantic Richfield Company<br>New York, N.Y. |

[54] SEISMIC HOLOGRAPHY
1 Claim, 14 Drawing Figs.

[52] U.S. Cl. ..................................... 340/15.5, 340/5
[51] Int. Cl. ..................................... G01v 1/00
[50] Field of Search .............................. 340/15.5 SC, 15.5 TA, 15.5 F, 15.5 H

[56] References Cited
UNITED STATES PATENTS

| 2,794,965 | 6/1957 | Yost | 340/15.5 |
| 3,221,298 | 11/1965 | Burns | 340/15.5 |
| 3,346,068 | 10/1967 | Woods et al. | 340/15.5 |
| 3,400,363 | 9/1968 | Silverman | 340/15.5 |
| 3,284,799 | 11/1966 | Ross | 343/6 |
| 3,461,420 | 8/1969 | Silverman | 340/15.5 |

*Primary Examiner*—Rodney D. Bennett, Jr.
*Assistant Examiner*—Joseph G. Baxter
*Attorneys*—Blucher S. Tharp and Robert E. Lee, Jr.

ABSTRACT: Apparatus and processes for seismic holography with emphasis on field procedures, recording methods, and interpretation processes. Coherent acoustical energy is transmitted into the earth and received with areal detector means. The received signals are mixed with a reference signal so that interference signals are obtained. The interference signals are recorded as spot exposures on photographic film or plates. After arranging the exposures in proper order and scaling, the resulting hologram is illuminated with coherent light. Subsurface structure is indicated by comparing pairs of holograms by observing their images. Holographic images can be combined in several ways to give a difference image which indicates change in subsurface structure.

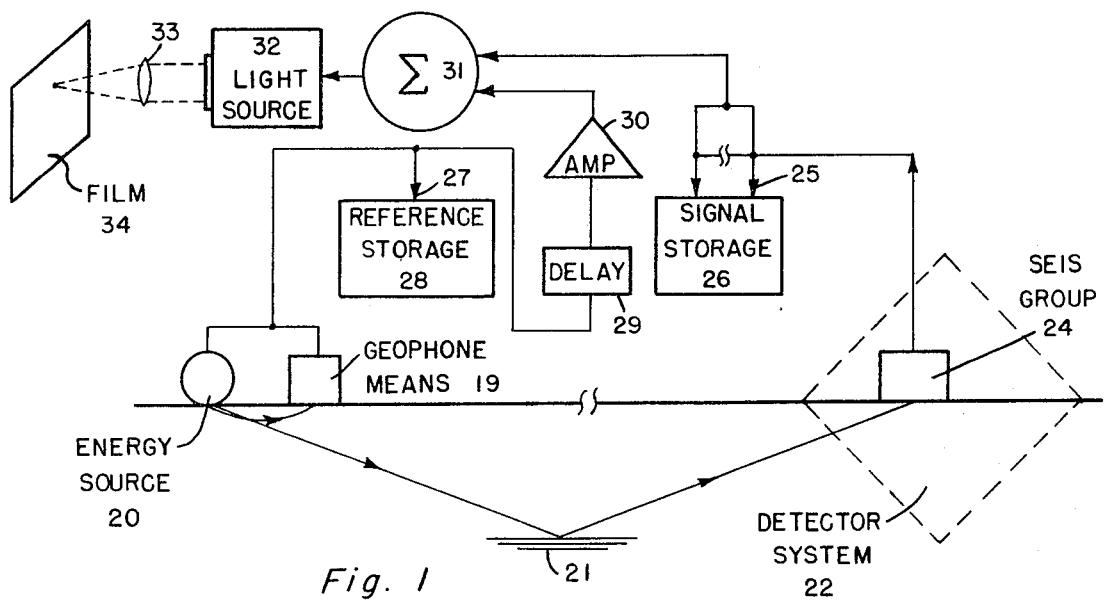
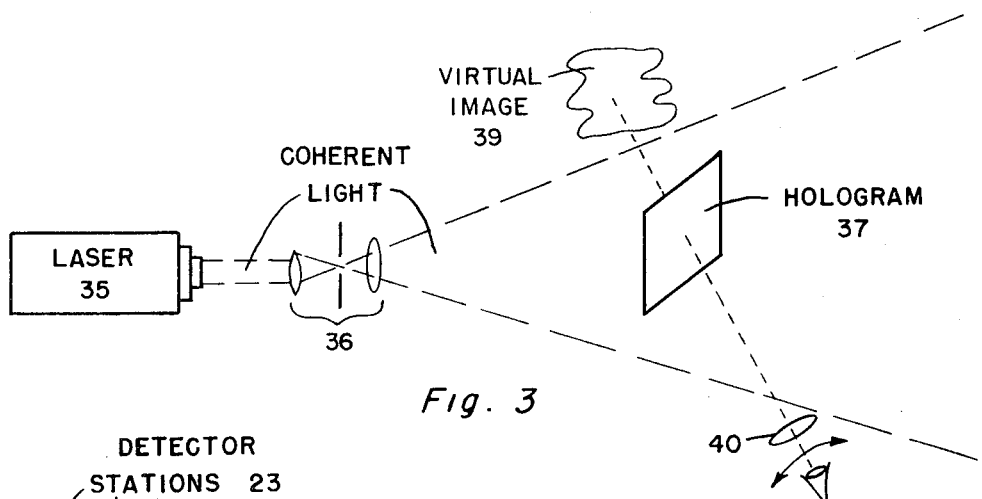
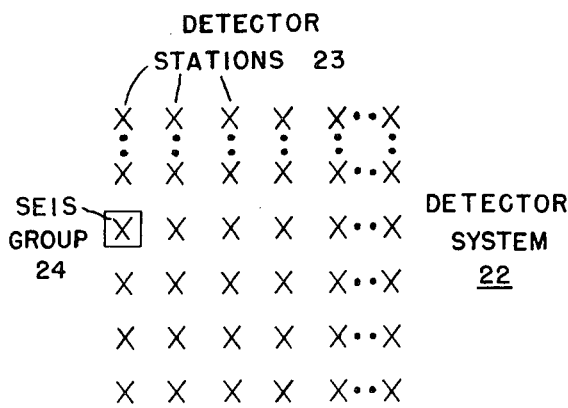
Fig. 1
Fig. 3
Fig. 2
INVENTORS
Eugene R. Brownscomb
William M. Campbell
Emmet D. Riggs
BY
Robert Ellsworth Lee
ATTORNEY INVENTORS
Eugene R. Brownscomb
William M. Campbell
Emmet D. Riggs
BY Robert Elsworth Lee
Attorney

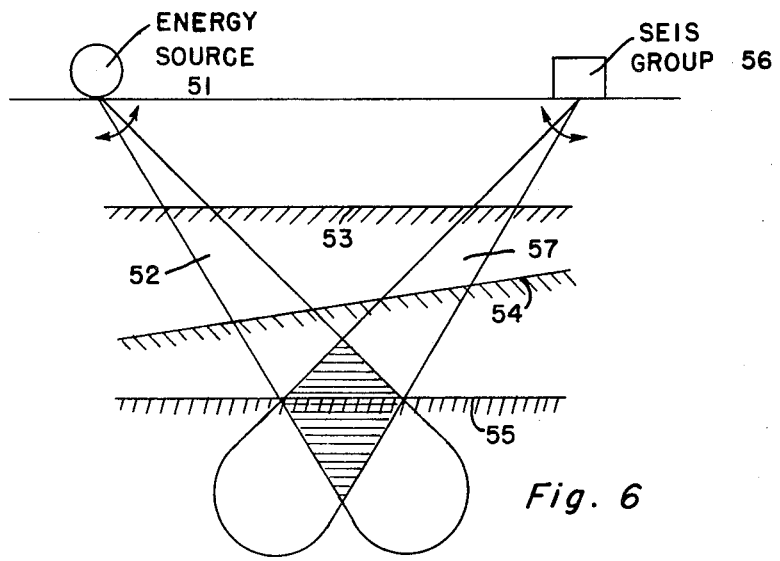
Fig. 6
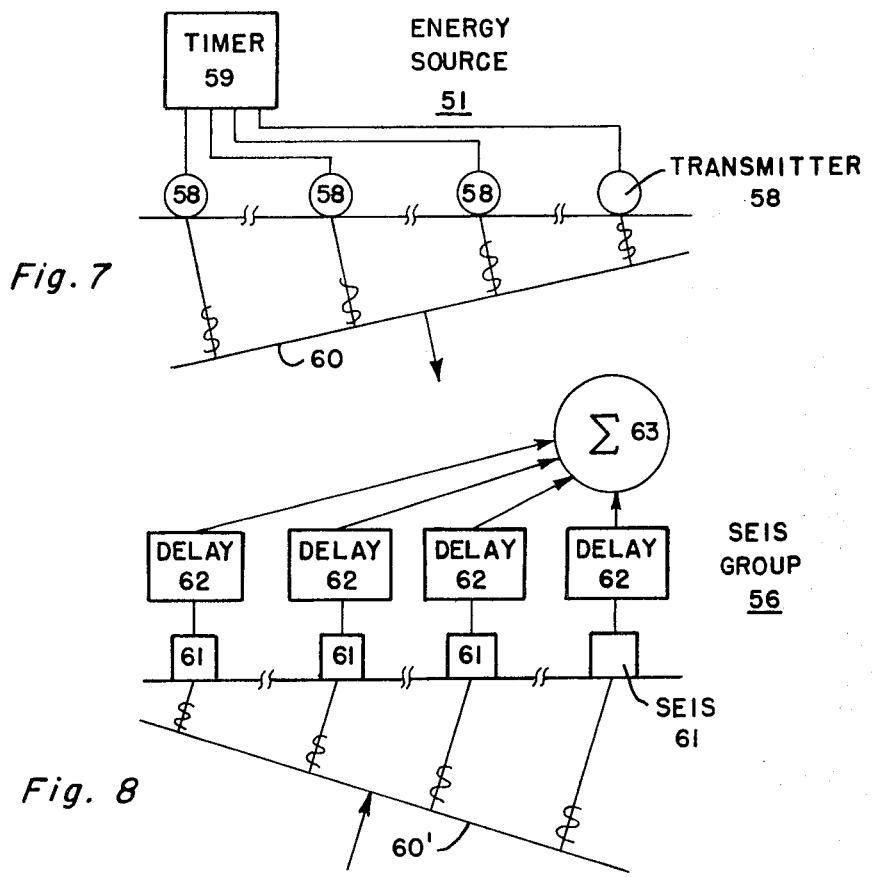
Fig. 7
Fig. 8

INVENTORS
Eugene R. Brownscomb
William M. Campbell
Emmet D. Riggs
BY Robert Elsworth Lee
Attorney INVENTORS
Eugene R. Brownscomb
William M. Campbell
Emmet D. Riggs INVENTORS
Eugene R. Brownscomb
William M. Campbell
Emmet D. Riggs
BY Robert Elsworth Lee
Attorney

SEISMIC HOLOGRAPHY

BACKGROUND OF THE INVENTION

The invention pertains to seismology and particularly concerns the application of holography to seismic prospecting.

Holography is fundamentally a way of recording wave radiation whether light waves, X-rays, or even (as herein disclosed) acoustic waves. When an object is illuminated with coherent waves, spherical wave fronts radiate from each object point which have a fixed phase relationship with one another. By mixing or combining the reflected object waves with a reference wave front, a fixed interference pattern will be generated which is recorded on photographic film in whites, blacks, and greys. The resulting picture is referred to as a hologram; it makes no sense when viewed in ordinary light, yet contains considerable information about the object. To translate the information, the hologram must be illuminated by a coherent beam that interferes constructively or destructively to produce a new wave front—one that is a copy of the wave front originally radiating from the object. The object itself can be seen by looking at the reconstructed wave front as it radiates from the hologram. It is not necessary that the hologram be reconstructed with the same wavelength used in making it, provided the hologram is scaled to compensate for the difference in wavelengths. Hence, reconstruction with visible light will produce visible images from holograms recorded with X-rays or acoustic waves (if the hologram is first suitably reduced).

General teachings of interest concerning holography and its application include the following articles which are incorporated herein by reference:

Leith and Upatnicks, *Scientific American*, June 1965, in an article entitled "Photography by Laser."

Pennington, *Scientific American*, Feb. 1968, in an article entitled "Advances in Holography."

El-Sum, *Science & Technology*, Nov. 1967, in an article entitled "Uses for Holograms."

Ennos, *Contemporary Physics*, Vol. 8, No. 2, 1967, in an article entitled "Holography and Its Applications."

Collier, *IEEE Spectrum*, July 1966, in an article entitled "Some Current Views on Holography."

At least one patent directed toward seismic holography has already appeared. Reference is made to Silverman, U.S. Pat. No. 3,400,363 (patented Sept. 3, 1968). Silverman proposes to transmit continuous sound waves of constant frequency into the earth and detect the returned energy with areal detector means. His detector means is comprised of a plurality of transducers forming a grid of points over the detector area connected to a plurality of light emitters (glow lamps). Each transducer controls the illumination of one of the light emitters according to the intensity of sonic energy received at its position. However, it is first necessary to mix each received signal with a reference signal, i.e., the transmitted sound waves. It follows that by arranging the array of light emitters in the same pattern as the detector transducers, a photographic record can be obtained which is the equivalent of a hologram.

SUMMARY OF THE INVENTION

The present invention provides (1) novel apparatus for performing seismic holography; (2) new processes for carrying out seismic holography operations; and (3) processes whereby one hologram may be compared with another.

The apparatus invented by Applicants for seismic prospecting comprises: (1) an energy source for generating sonic waves of controlled frequency; (2) areal detector means including at least one seismometer group and composed of a plurality of spaced apart detector stations; (3) storage means for recording the seismic signal received at each of the detector stations; (4) geophone means associated with the energy source; (5) storage means for recording the output of the geophone means as a reference trace; (6) delay means for operating on the reference signal; (7) amplifier means for adjusting the energy level of the reference signal; (8) an addition circuit for combining selected individual seismic signals with the reference signal; (9) a light source whose energy output is modulated of the output of the addition circuit; and (10) photographic means for recording the energy output of the light source.

In preferred embodiments, the energy source (1) is composed of a plurality of spaced apart transmitters connected to and controlled by a timer and/or (2) the seismometer group is composed of a plurality of seismometers with associated delay means connected in parallel to an addition circuit.

The operation of the above apparatus can be explained by considering the processes for seismic holography invented by Applicants. In brief, Applicants' basic process comprises:

(1) transmitting coherent acoustical energy into the earth; (2) receiving the energy with areal detector means at a plurality of detector locations; (3) combining the seismic signal received at each of the locations with a reference signal to produce a plurality of interference signals; (4) modulating the illuminous intensity of a light source with each of the interference signals; (5) forming a photographic record of the light output resulting from each modulation by making a spot exposure; (6) arranging the order of the resulting spot exposures so that they are in the same geometrical relation as their detector locations; (7) scaling the hologram thus obtained in order to reduce it to dimensions compatible for reconstruction at optical wavelengths; and (8) illuminating the hologram with coherent light so that a holographic image is formed.

Preferably, (1) the reference signal is obtained by detecting the acoustical energy at a location adjacent to its point of input into the earth; (2) the reference signal is amplified to a predetermined level with respect to each seismic signal with which it is to be combined; (3) the reference signal is delayed by a predetermined amount in order to place it in time alignment with reflections from a preselected formation; (4) the acoustical input energy is focused into a directional beam; and/or (5) the response pattern of the detector means is focused into a directional beam.

Applicants have also invented a process for seismic holography comprising: (1) transmitting coherent acoustical energy into the earth; (2) receiving the energy with areal detector means so that reflections are obtained from first and second areas of the same formation; (3) preparing first and second holograms based on the received seismic energy representing reflections from the first and second areas; (4) illuminating the holograms with coherent light; and (5) comparing the resulting holographic images.

An improvement on the above process involves comparing the holographic images with a series of standard holographic images representing known subsurface structures.

Applicants finally have developed various processes for comparing one hologram with another as set forth below:

One such process comprises: (1) making a reversal of one of the holograms; (2) superimposing the reversal and the second hologram; (3) illuminating the reversal and the second hologram with coherent light; and (4) observing the resulting holographic image.

An alternate process comprises: (1) making a reversal of one of the holograms; (2) arranging the reversal and the second hologram side by side; (3) illuminating the reversal and the second hologram with coherent light; (4) optically superimposing the resulting holographic images; and (5) observing the resulting composite image.

Another alternative process comprises: (1) making a reversal of one of the holograms; (2) illuminating the reversal and the second hologram with coherent light; (3) superimposing the resulting two holographic images on film; and (4) observing the image recorded on the film.

Still another alternative process comprises: (1) illuminating first and second holograms with coherent light; (2) recording the resulting two holographic images on film; (3) making a reversal of one of the images; (4) superimposing the other image and the reversal; and (5) observing the resulting composite image.

BRIEF DESCRIPTION OF THE DRAWINGS

FIG. 1 is a schematic drawing showing Applicants' apparatus for seismic holography and illustrates the recording of a hologram.

FIG. 2 is a further illustration of the detector system shown in FIG. 1.

FIG. 3 is a schematic drawing showing the reconstruction of a hologram.

FIG. 6 is a schematic drawing illustrating the use of directional transmitting and receiving beams.

FIG. 7 shows the makeup of the energy source shown in FIG. 6.

FIG. 8 shows the makeup of the seismometer group shown in FIG. 6.

DETAILED DESCRIPTION OF THE INVENTION

Figure 4:
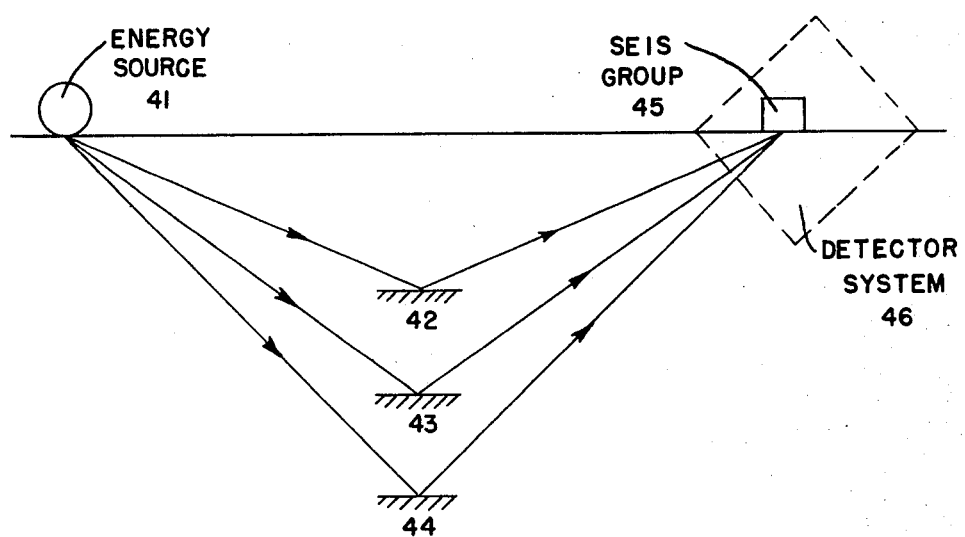
FIG. 4 is a schematic drawing illustrating the reflection of sonic energy from a plurality of formations.

To gain a better understanding of the invention, refer first to FIG. 1 which shows how seismic holograms are recorded. Energy source 20 is a continuous wave generator such as an electric shaker, an hydraulic piston, or the like capable of producing a carefully controlled frequency output signal. As the transmitted energy travels downward, it is reflected each time it encounters an interface so that a portion of its energy is returned to the surface. For example, some of the transmitted energy will strike subsurface formation 21 so that it is received by detector system 22 located on the surface. Referring to FIG. 2, detector system 22 is an areal receiving means composed of a plurality of detector stations 23 and includes one or more seismometer groups such as group 24. Detector stations 23 form a two dimensional array over a predetermined area of the earth's surface for sampling seismic signals. Typically, detector stations 23 are selected to cover an area from about a quarter of a square mile to a square mile or more and are more or less uniformly spaced apart within this area. (Although a square pattern is depicted, detector system 22 can be circular, rectangular, or geometrically irregular in shape.) The spacing among detector stations 23 is generally on the order of 100 to 600 feet with close spacing being preferred.

Although only a single seismometer group has been shown in FIG. 2, it is apparent that a plurality of seismometer groups can be utilized if so desired. The object is to record a separate seismic channel representing each of the detector stations. This can be accomplished (1) by using a single seismometer group and moving it from station to station, (2) by employing a plurality of seismometer groups and recording at several stations at one time, or (3) by positioning a seismometer group at each detector station.

Referring back to FIG. 1, seismometer group 24 is comprised of one or more seismometers (geophones) connected in series or parallel. A group (either series or parallel) is used to cancel the effects of surface irregularities. Moreover, a parallel (or series-parallel) spread is used to achieve directional sensitivity, as will be disclosed in conjunction with FIG. 8. The output signal from seismometer group 24 is passed to transducer means 25 which records it on storage means 26. When seismometer group 24 is moved to a different detector station, the seismic signal it receives is recorded by transducer means 25 on storage means 26 in side by side relation to the first trace. Similarly, a separate trace is recorded on storage means 26 representing the detected signal for each detector location in detector system 22. (Storage means 26 can be a magnetic recording drum, a core memory device, or any means for recording the seismic signals in reproducible form.)

It is necessary to have a reference signal which corresponds to the sonic signal that energy source 20 transmits into the earth. The drive signal to source 20 can be used for this purpose; preferably, however, the actual output signal of source 20 is detected. Accordingly, a geophone means 19 is positioned in close proximity to source 20 so that it can detect the output signal which is in fact introduced into the earth. The reference signal is then recorded by transducer means 27 on storage means 28. (Storage means 26 and 28 can be the same device if so desired.)

When it is decided to process one of the seismic signals received by detector system 22, the reference signal is played back from storage means 28 by transducer means 27 and passed to time delay unit 29. The purpose of delay unit 29 is to adjust the playback of the reference signal so that there will be appropriate interference, i.e., proper phase, between their waveforms. Delay unit 29 can be a delay drum, an electrical delay circuit, etc. The delayed reference signal is then passed to amplifier means 30 where its amplitude is adjusted with respect to the seismic signal. (It is apparent that the order of time delay unit 29 and amplifier means 30 can be reversed, i.e., the reference signal can first be amplified and then time delayed.) The reference signal may be given a fixed amplitude or an amplitude which varies with time; either way its amplitude is generally on the order of three to 10 times that of the seismic signal. The goal is to choose amplitude values which will result in an interference signal having maximum information regarding the formation of interest; hence, some trial and error testing may be necessary.

The seismic signal which is to be processed is played back by transducer means 25 and passed to addition circuit 31 where it is combined with the reference signal. The resulting interference (summation) signal modulates light source 32 so as to control the intensity of its illumination. (A suitable light source is a Crater type lamp R11131C made by Sylvania.) Light from source 32 is focused by converging lens 33 so that it falls on a preselected spot, i.e. a small area, of photographic film 34. This process is repeated for each seismic signal recorded on storage means 26 with the result that each seismic signal is mixed with the reference signal and each interference signal so produced is recorded as a separate spot on photographic film 34.

The location of the several spots relative to one another is important and should correspond to the geographical relationship of the detector stations to one another. Film 34 can be exposed to accomplish this (1) by originally recording the spots so that they are in the desired relationship or (2) by arranging the spots after they are recorded so that they are in proper sequence. By way of example, a properly composited film based on detector system 22 (FIG. 2) would have 36 spot exposures forming a mosaic with six exposures on each side. Moreover, the arrangement of the spot exposures would correspond and be proportional to the geometrical relation of their respective detector locations.

An alternate procedure to follow for exposing the film is that shown by Silverman in U.S. Pat. No. 3,400,363 wherein each seismometer group has an exclusive light source which is part of a complex luminous array. As before, each seismic signal is mixed with a reference signal and the resulting interference signals are used to modulate the light output of their associated sources. However, the film plate is exposed to all of the light sources at one time so that the hologram is formed in a single step, rather than sequentially (spot by spot).

Whether Applicants' process is followed or Silverman's, the resulting exposure of film 34 to these many signals causes an interference pattern to develop on the film which is in the form of points of varying density, increasing in density where the wavefronts arrive in phase and augment each other and decreasing in density where they are out of phase. The photographic record thus obtained is a pattern of interfering wavefronts, i.e., a hologram. It shows no resemblance to the subsurface structure; nonetheless, it contains useful seismic information which can be extracted by special interpretation techniques.

Before the hologram is reconstructed, it is generally desirable to adjust the scaling in order to get a more definitive fringe pattern. This is necessary because the hologram was recorded with seismic waves whereas reconstruction will be with optical waves. For example, assume that the wavelength of the sound waves is 200 feet and the wavelength of the reconstructing light is 6000 A°. A scaling factor of about $10^{-8}$, i.e., the ratio of the wavelength of light to sound, will cause the holographic image to appear in proper scale. If the hologram is reduced by a lesser factor, the scaled down image will appear further away (in scaled distance) than it really is; conversely, scale reduction by a greater factor will result in magnification.

The desired scale reduction can be performed by photographic reduction techniques or mathematically (based on calculations on a computer). The former process is carried out after initial recording of the hologram. For example, if the hologram were based on detector means with field dimensions of 6,000×6,000 feet, it would have to be scaled down from 3 inches to 0.015 mm. on a side and observed under a microscope. The latter process is performed prior to recording the hologram. In essence, the received acoustical energy is converted into equivalent light energy which is then used to modulate the light source so that a conventional 3×3 inch hologram is obtained.

The reconstruction of the hologram is illustrated in FIG. 3. (It is assumed that the spot exposures are properly arranged and that the necessary scaling has already been done.) Laser 35 can be any convenient source of coherent light, e.g., a He-Ne laser. Lens system 36 focuses the output coherent light into a beam which illuminates hologram 37. If observer 38 now views the hologram, he will see virtual image 39 which will appear as a pattern of light spots. Where desired, observer 38 may view hologram 37 through eyepiece 40 which magnifies image 39. As observer 38 changes his position, he will see a different field of view. Also, observer 38 can see a conjugate image (not shown) on the same side of hologram as he is on which will appear reversed with respect to virtual image 39. A photographic record can be made showing either image in various shades of grey; the three-dimensional effect can be maintained by making a series of photographs from different locations on motion-picture film.

What observer 38 usually sees is an image of the output signal from energy source 20, FIG. 1. This is because the subsurface reflections of the transmitted energy are essentially specular in character. Thus, instead of seeing the image of subsurface formation 21, as would be the case if the reflected energy was primarily diffuse, one sees a pattern of light spots which is a mirrored picture of the source output, i.e., the transmitted acoustical energy.

Seismic holography, however, has its points of difficulty in actual practice. Noise generated by seismic surface effects, multiples, etc., obscure interesting and important deep details. Moreover, acoustic holography makes transparent such a mass of details that it is hard to determine which signals come from which formations. One approach that applicants use to solve these problems is to adjust the amplitude of the reference signal so that energy coming from a particular depth is enhanced, while discriminating against energy derived from shallower or deeper formations. The transmitted energy decreases exponentially as a function of depth so that for any given depth there is an optimum value or range of values for weighting the reference signal prior to mixing it with the received seismic signal. By controlling the amplification factor of the reference signal, a certain degree of depth selection can be achieved so that the desired formation can be viewed to the exclusion of more shallow or more deep formations. This is in effect depth of field focusing.

Figure 5:
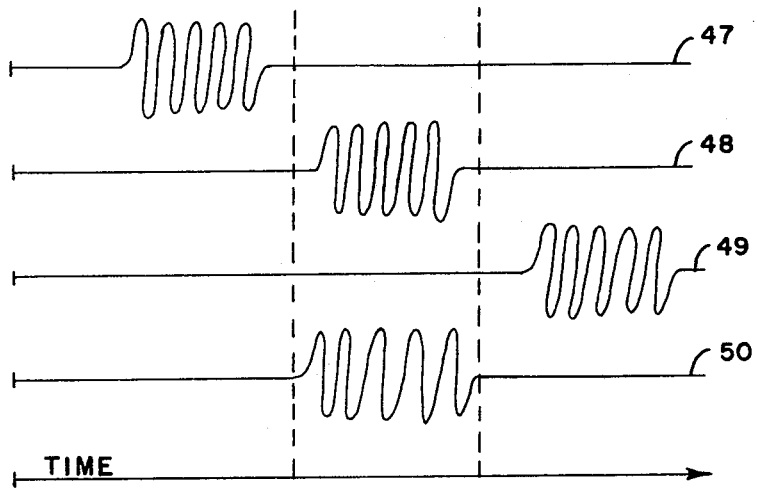
FIG. 5 is a series of waveform drawings representing reflections from the formations shown in FIG. 4.

Another approach devised by applicants to avoid the aforesaid problems is given in FIGS. 4 and 5. Referring to FIG. 4, energy source 41 transmits a coherent beam of energy which is reflected off of subsurface formations 42, 43, and 44 toward seismometer group 45 of detector system 46. The energy reflected from formation 42 will be received first, since it has the shortest distance to travel; next in order of time is the energy reflected from formation 43; and lastly comes the energy reflected from formation 44. This is illustrated in FIG. 5 by waves 47, 48, and 49 which represent reflections received by seismometer group 45 from formations 42, 43, and 44, respectively. Now, suppose it is desired to isolate the seismic signal returned by formation 43. This can be done by time delaying the reference signal, as indicated by wave 50, so that it is substantially in time alignment with 48, but out of alignment, at least in part, with waves 47 and 49. This results in a summation signal based mainly on the interference between the reference signal and the reflections from formation 43. (Referring to FIG. 1, addition circuit 31 is only turned on while the reference signal is being introduced so that the unwanted reflections are effectively eliminated.) Thus, formation selection can be accomplished, assuming there is little or no overlap in time between the reflections from the formation of interest and adjacent formations.

Contrary to conventional continuous wave (CW) operations where a varying frequency signal or sweep is generated, the seismic energy must be coherent in order for a hologram to even be produced. This means that the energy source must produce a nearly constant frequency signal over an interval sufficient so that mixing the reference signal will result in a representative interference signal. Each generated signal should have a constant frequency over a minimum of about five cycles and preferably on the order of 10 cycles. Transmitting signals of longer time has the disadvantage that overlap results in the reflections returned by the several formations reducing formation selectivity. Accordingly, it is common practice to direct a plurality of relatively short signals to each detector location and then add these to obtain a summation signal which is used to represent the station.

A problem of some difficulty, however, is that the energy source cannot be abruptly started and stopped at will without causing incoherence by introducing unwanted frequencies. What Applicants recommend is to operate the energy source at a first or base frequency and then to rapidly switch to a second or signal frequency when it is desired to transmit a seismic signal. These two frequencies need only differ by about one half cycle/second, i.e., by an amount sufficient to ensure that they are not coherent. Thus, once the energy source is operating at the base frequency, it can be abruptly switched so that it operates at the signal frequency for the desired length of time and then switched back again to the base frequency. If this change over is fast enough, the coherence of the signal frequency will be maintained since other frequencies will not be introduced to any extent. (The signal frequency is, of course, used as the reference signal in the reconstruction process.)

Still another approach for improving the signal-to-noise ratio is to focus the transmitted seismic energy into a directional beam and/or to focus the response pattern of the receiving system into a directional beam. This procedure is shown in FIGS. 6 to 8. Reference is also made to Woods et al. U.S. Pat. No. 3,346,068 (patented Oct. 10, 1967).

Referring to FIG. 6, energy source 51 projects a directional beam 52 of seismic energy which cuts across subsurface formations 53, 54, and 55. Seismometer group 56 focuses its response pattern into a directional beam 57 which also crosses formation 53, 54, and 55. (Although both beams are shown focused into straight patterns, it should be understood that they are actually bent as they traverse interfaces between subsurface layers having different properties.) The intersection of beams 52 and 57 serves to illuminate a volume 58 of the subsurface, which is crosshatched for emphasis. Beams 52 and 57 can be moved individually or simultaneously to illuminate different volumes of the subsurface as desired. (For purposes of simplification, both beams are shown as approximately equal in width, but in actual application their relative widths may vary as operating conditions dictate.)

Energy source 51 is shown in more detail in FIG. 7. It is composed of a plurality of transmitters 58 located at spaced intervals and connected to timer 59. Transmitters 58 all operate at the same frequency (or frequencies) and are driven and precisely controlled by timer 59 on a variable delay means. Transmitters 58 are actuated in a sequential manner to produce directional plane wavefront 60, the direction of travel of which is determined by the delay times introduced by timer 59 between the generated signals.

Referring to FIG. 8, it will be seen that seismometer group 56 is composed of a plurality of spaced apart seismometers 61 connected in series with delay units 62 and in parallel to addition circuit 63. The response pattern of seismometer group 56 is focused by delaying and adding the output of each of the seismometers to receive wavefront 60'. (It is important to appreciate that seismometer group 56 is used at one of the detector stations shown in FIG. 2; accordingly, a number of directional receiving systems must be set up to form an areal detector system with directional sensitivity.)

Another problem with seismic holography is how to derive useful information from a hologram once it is obtained. What applicants propose is to compare one hologram with another in such a way so that their differences, if any, will readily be apparent. The ideas behind this method may be gleaned by inspecting FIGS. 9 to 10.

Figure 9:
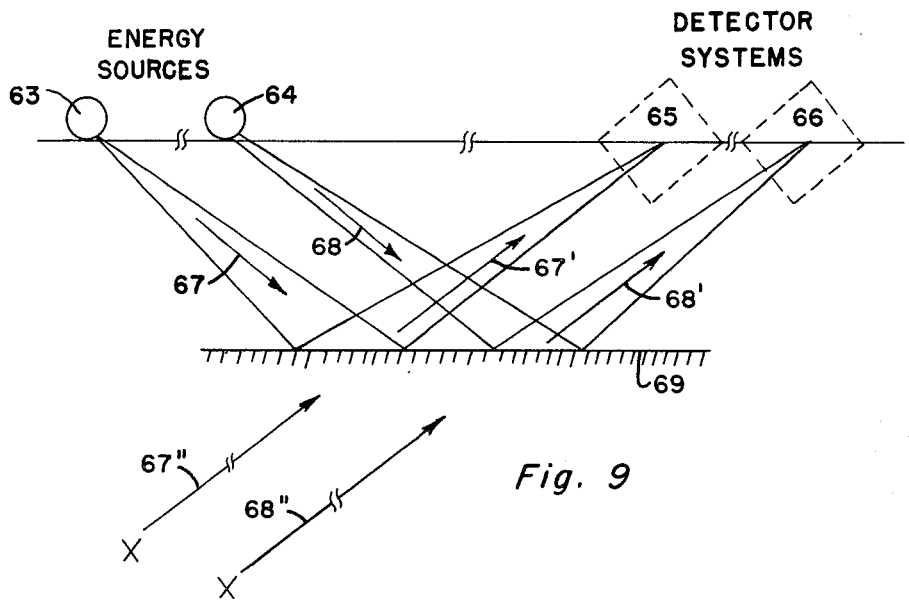
FIG. 9 is a schematic drawing showing the recording of a pair of holograms where the reflecting formation is horizontal.

Referring first to FIG. 9, one sees energy sources 63 and 64 having associated detector systems 65 and 66, respectively. Assume that essentially identical signals are generated at different times by sources 63 and 64, as indicated by rays 67 and 68. Reflections from horizontal formation 69, i.e., rays 67' and 68', are received by detector system 65 and 66. It will be seen that the transmitted signals strike different areas of horizontal formation 69; however, since specular reflection predominates at the frequencies involved, the resulting holographic images are about the same in both cases. In other words, if the images of the two holograms are compared, no significant differences will be apparent to the eye. Furthermore, both images will appear to originate at the same depth, as indicated by rays 67'' and 68''.

Figure 10:
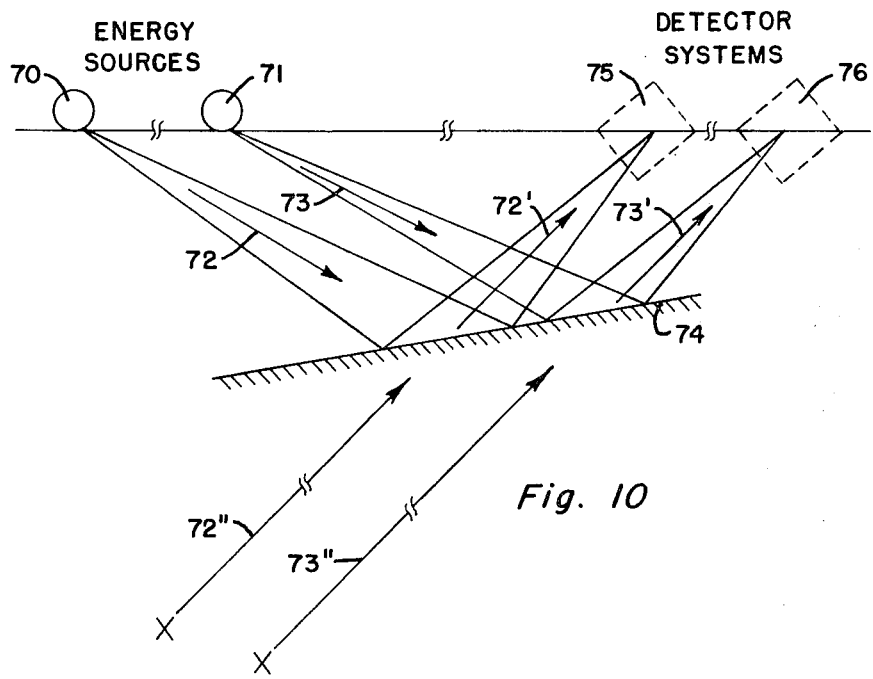
FIG. 10 is a schematic drawing showing the recording of a pair of holograms where the reflecting formation is sloping.

Now, looking at FIG. 10, one sees the effect of a sloping formation under comparable conditions. Signals generated by energy sources 70 and 71, i.e., rays 72 and 73, are bounced off of sloping formation 74, as shown by rays 72' and 73', and detected by detector systems 75 and 76, respectively. Contrary to the above situation, the resulting holographic images will appear substantially different when viewed by an observer. Additionally, it will appear that the images originate at different depths, as indicated by rays 72'' and 73''. (Similarly holographic images made of faults or other anomalies will stand out when compared with images of horizontal or sloping formations.)

FIGS. 9 and 10 are intended to merely exemplify several of many different physical situations which are encountered in nature. Interpretation will be difficult even though the technique of comparing holograms representing adjacent subsurface is employed due to the many possible variations. Accordingly, applicants recommend that a series of standard holographic images be prepared representing known subsurface structures, which can then be used for comparative purposes. Pairs of holograms obtained in an area of interest can be compared to determine a "trend of change" which hopefully can then be found in the standards so as to establish the type of structure involved.

Figure 11:
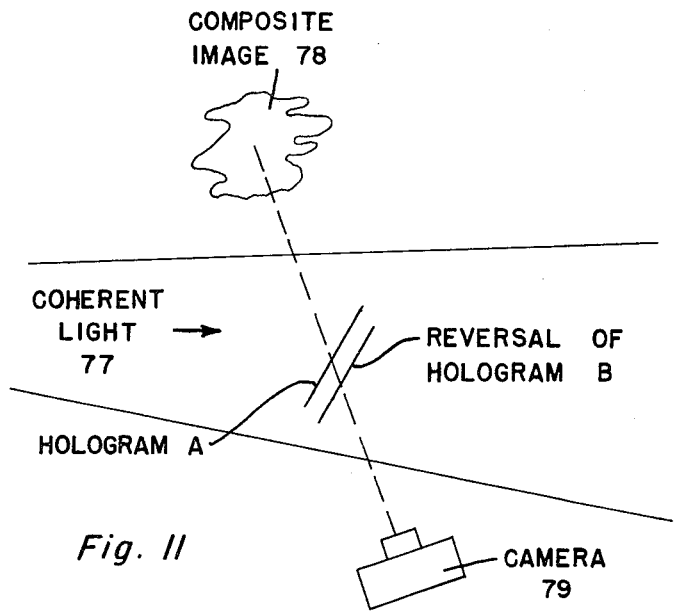
FIG. 11 illustrates the addition of holographic images by superimposing the holograms.

It is difficult to compare two holograms directly; however, it is a relatively simple matter to compare their images. This can be done by a subtraction process as illustrated in FIG. 11 where a difference image between holograms A and B is produced. A reversal of one of the holograms, e.g., B, is prepared by exposing a partially developed negative to strong light and redeveloping. Hologram A and the reversal of hologram B are then placed in series so that they are illuminated by beam 77 of coherent light. Composite image 78, i.e., the sum of the images of hologram A and the reversal of hologram B, is equivalent to the difference image of holograms A and B. If holograms A and B are identical, their images will likewise be identical and composite image 78 will be a uniform exposure. On the other hand, if holograms A and B are different, their images will also be different and image 78 will show some sort of light pattern. The results are recorded by camera 79 so that a permanent record of the composite image is obtained.

Figure 12:
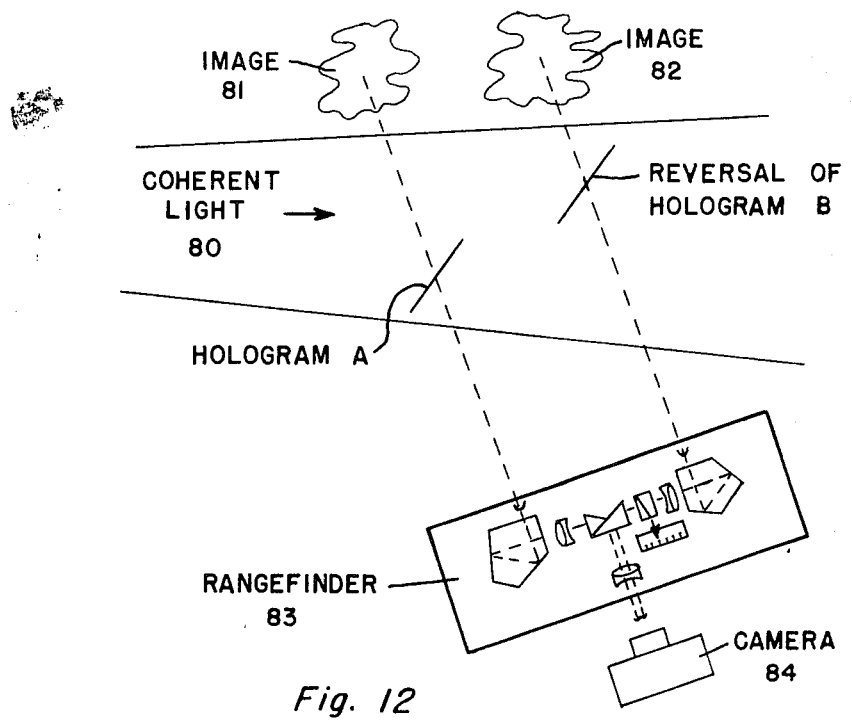
FIG. 12 illustrates an optical process for combining holographic images.

Another way holographic images can be compared is by the use of an optical device such as a rangefinder as shown in FIG. 12. Assume that holograms A and B are to be compared and that a reversal is made of hologram B. Hologram A and the reversal of hologram B are placed in parallel and illuminated by beam 80 of coherent light. Resulting images 81 and 82 are viewed through coincidence-type rangefinder 83 which is adjusted so that images 81 and 82 are optically superimposed, i.e., a minimum intensity image is seen. The composite image thus formed is recorded by camera 84 and is the difference image obtained by subtracting the images of holograms A and B.

Figure 13:
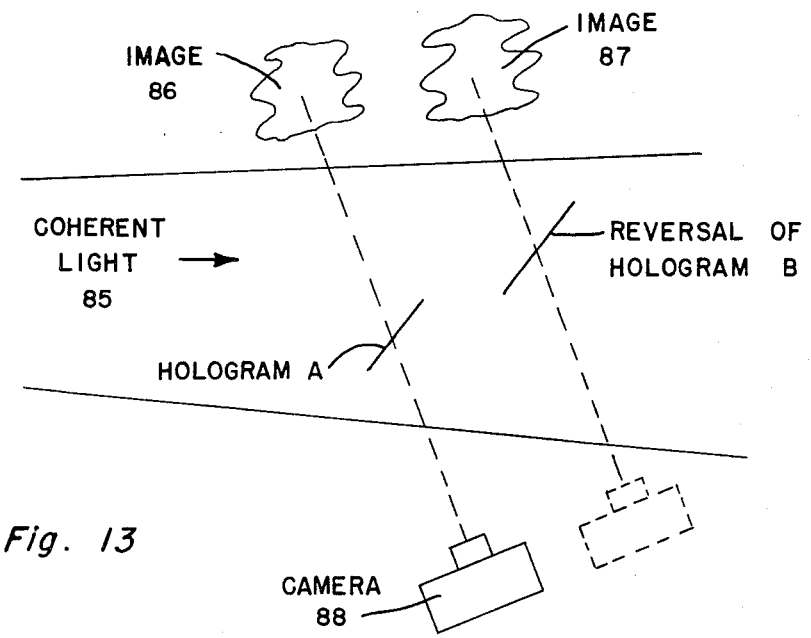
FIGS. 13 and 14 illustrate the use of photographic processes for combining holographic images.

Still another way of processing holograms A and B so as to obtain a difference image is the superimposition of their images on film, as illustrated in FIG. 13. Again, a reversal of one of the holograms, e.g., B, is made. Hologram A and the reversal of hologram B are placed in beam 85 of coherent light so that images 86 and 87 are formed. This may be done by exposing both holograms to beam 85 at the same time or exposing them serially. Camera 88 is first located so that it can make a partial exposure of image 86 and, second, is moved to the location indicated in broken lines so that it can complete the exposure of its film by recording image 87. Hence, images 86 and 87 are both recorded on the same film resulting in a double exposure which again is equivalent to the difference image of holograms A and B.

Figure 14:
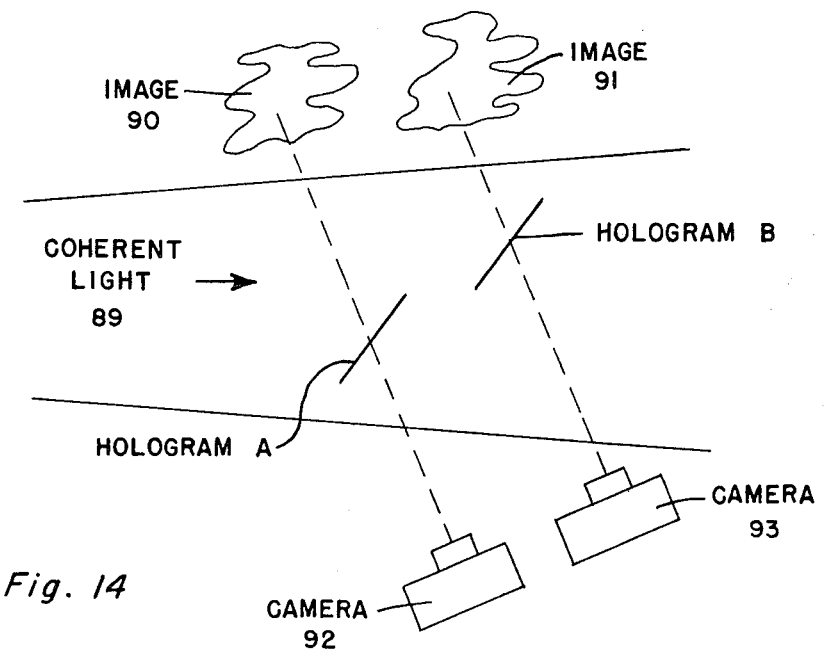

Yet, another way to obtain a difference image of two holograms by photographic means is depicted in FIG. 14. Holograms A and B are illuminated by beam 89 of coherent light without making a reversal. This operation can be done by placing holograms A and B in parallel so that they are exposed to beam 89 at the same time or by exposing them serially. Resulting images 90 and 91 are recorded by cameras 92 and 93. (One camera can be used if different film plates are employed.) A reversal of one of the images, e.g., 91, is then made. Slides are prepared representing image 90 and the reversal of image 91 which are placed in series and projected on a screen for viewing. Again, it will be evident that the resulting picture is in effect the difference image of holograms A and B.

What is claimed is:

1. A process for seismic holography comprising
   a. transmitting coherent acoustical energy into the earth at a first surface location,
   b. receiving seismic signals with areal detector means at a plurality of detector locations remote from said first location,
   c. obtaining a reference signal by detecting transmitted acoustical energy at a point adjacent said first location,
   d. selectively time delaying said reference signal with respect to each seismic signal with which it is to be combined in order to achieve maximum interference,
   e. amplifying said reference signal to a predetermined level relative to each seismic signal to accomplish field of depth focusing,
   f. combining each of said seismic signals with the reference signal as modified in steps (d) and (e) to produce a plurality of corresponding interference signals,
   g. modulating the illuminous intensity of a point source of light with each of said interference signals,
   h. forming a photographic record of the light output resulting from the modulations such that a plurality of spot exposures are formed having the same geometrical relation as the detector locations where the seismic signals were derived, i. scaling said photographic record in order to reduce it to dimensions compatible for reconstruction at optical wavelengths, and
j. illuminating the hologram thus obtained with coherent light so that a holographic image is formed of the earth's subsurface.

* * * * *